(12) United States Patent
Ueda et al.

(10) Patent No.: US 7,298,438 B2
(45) Date of Patent: Nov. 20, 2007

(54) SEMITRANSPARENT REFLECTOR

(75) Inventors: Takahiko Ueda, Ibaraki (JP); Hiroshi Koyama, Ibaraki (JP); Tomotsugu Takahashi, Tokyo (JP)

(73) Assignee: Yupo Corporation, Tokyo (JP)

( * ) Notice: Subject to any disclaimer, the term of this patent is extended or adjusted under 35 U.S.C. 154(b) by 51 days.

(21) Appl. No.: 10/810,684

(22) Filed: Mar. 29, 2004

(65) Prior Publication Data

US 2004/0246415 A1 Dec. 9, 2004

Related U.S. Application Data

(63) Continuation-in-part of application No. PCT/JP02/10032, filed on Sep. 27, 2002.

(30) Foreign Application Priority Data

Sep. 28, 2001 (JP) ............... 2001-299547

(51) Int. Cl.
*G02F 1/1335* (2006.01)
(52) U.S. Cl. ..................... 349/113; 349/114
(58) Field of Classification Search .................. 349/64, 349/112, 113–114
See application file for complete search history.

(56) References Cited

U.S. PATENT DOCUMENTS 5,807,440 A 9/1998 Kubota et al.
6,665,027 B1* 12/2003 Gunn et al. ..................... 349/95
6,778,241 B1* 8/2004 Arai et al. ..................... 349/114
6,906,767 B1* 6/2005 Iijima ........................ 349/113
2002/0027626 A1* 3/2002 Hiraishi et al. ............. 349/112

FOREIGN PATENT DOCUMENTS

| | | |
|---|---|---|
| JP | 7-281010 | 10/1995 |
| JP | 9-96705 | 4/1997 |
| JP | 10-193494 | 7/1998 |
| WO | WO 00/07043 | 2/2000 |

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

Disclosed is a semitransparent reflector having a whole light transmittance (T) of 10-80%, a whole light reflectance (R) of 20-90%, (T+R) of 80-100%, and (R−Rd) of 8-30% in which $R_d$ is the whole light diffusion reflectance. When installed in a display device, the semitransparent reflector ensures efficient light transmission and reflection, and attains a high transmittance and a high reflectance of the display device, therefore significantly improving the letter visibility of the device.

20 Claims, 1 Drawing Sheet

SEMITRANSPARENT REFLECTOR

This application is a continuation-in-part of PCT/JP02/10032 filed Sep. 27, 2002 claiming priority of Japanese Patent Application No. 299547/2001 filed Sep. 28, 2001.

BACKGROUND OF THE INVENTION

1. Field of the Invention

The present invention relates to a semitransparent reflector. Precisely, the invention relates to a semitransparent reflector that transmits the light from a light source on the back side thereof and reflects the light from a light source on the front side thereof to thereby realize a high brightness.

2. Description of the Background

A display device is known, in which the built-in light source is switched on in the dark to visualize the display image by the action of the transmitted light, but is switched off in the light to visualize the display image by the action of the external reflected light. Its typical constitution is shown in FIG. 1, in which the back side of the liquid-crystal cell is specifically noted. The constitution is characterized in that a polarizer and a semitransparent reflector are laminated on the back side of the liquid-crystal cell in that order.

In the liquid-crystal unit of the type, the semitransparent reflector functions for efficiently utilizing the light from the built-in light source in the dark and the light from the external light source in the light both for displays, and also for realizing displays that meet various objects. In general, glaring transmitted light and reflected light are disliked. For increasing the display visibility, the transmittance and the reflectance of the semitransparent reflector must be well balanced, and the display device must have high transmittance and high reflectance.

Heretofore, a semitransparent reflector fabricated by forming a coating layer with a filler such as pearl pigment, silica, alumina or the like therein on a transparent or opacity-controlled base film is used, and its whole light transmittance T and whole light reflectance R are specifically controlled. Also known is a technique of adding the same type of filler as above to the adhesive for bonding a polarizer and a semitransparent reflector to thereby specifically control the whole light transmittance T and the while light reflectance R of the reflector.

These semitransparent reflectors that have heretofore been known may enjoy the balance between the brightness from the transmitted light and the brightness from the reflected light, but could not often attain the intended transmission and reflection brightness in display devices, depending on the optical properties of the constituent components.

The present invention is to attain efficient light transmission and reflection in a display device with a semitransparent reflector installed therein, and to attain a high transmittance and a high reflectance of the display device so as to significantly improve the letter visibility of the device.

SUMMARY OF THE INVENTION

We, the present inventors have assiduously studied to realize the improvement of the light transmittance and the light reflectance of a display device, and have found that the improvement may be attained by taking a good balance between the transmission brightness and the reflection brightness of the semitransparent reflector in the device and by reducing the diffusive reflection on the semitransparent reflector.

For realizing the reduction in the light diffusion of the reflected light on a semitransparent reflector, we have considered that a constitution as in FIG. 2 is good in which flaky pores (D) are oriented in the base layer (A) parallel to the surface of the semitransparent reflector and the base layer is coated with protective layers (B) and (C).

For realizing the flaky pores oriented relative to the surface of the semitransparent reflector, we have found that incorporating a flaky inorganic fine powder and/or an organic filler into the base layer and biaxially stretching the base layer is good. In addition, we have found that the structure of the flaky pores (D) is preferably like a true circle (X/Y≈1), and have completed the present invention.

Specifically, the invention provides a semitransparent reflector having T of from 10 to 80%, R of from 20 to 90%, (T+R) of from 80 to 100%, and (R−$R_d$) of from 8 to 30% in which T(%) indicates the whole light transmittance of the reflector, R(%) indicates the whole light reflectance thereof, $R_d$(%) indicates the whole light diffusion reflectance thereof, and they are measured according to JIS-Z-8722. Preferably, the semitransparent reflector of the invention is a multi-layered, biaxially-oriented film, comprising a base layer (A) and protective layers (B) and (C) that contain a thermoplastic resin, a flaky inorganic fine powder and/or an organic filler, and it has flaky pores (D).

Also preferably, the flaky pores (D) have X/Y of from 0.1 to 10, Y/H of from 20 to 1000 and a porosity of from 0.1 to 20%, in which X indicates the pore diameter (μm) in the machine direction, Y indicates the pore diameter (μm) in the transverse direction, and H indicates the pore height (μm).

Also preferably, the thickness of the base layer (A) of the multi-layered, biaxially-oriented film is from 10 to 200 μm. Also preferably, the amount of the flaky inorganic fine powder and/or organic filler in the base layer (A) is from 2 to 30% by weight; and the amount of the flaky inorganic fine powder and/or organic filler in the protective layers (B) and (C) is from 0 to 30% by weight. Also preferably, the flaky inorganic fine powder has a mean particle size of from 3 to 30 μm, and a mean aspect ratio of from 2 to 100; and the organic filler has a mean dispersion particle size of from 10 to 50 μm, and a mean aspect ratio after biaxially stretched of from 10 to 1000.

Also preferably, the absolute value of the difference between T and R of the multi-layered biaxially-oriented film, |(T−R)| is at most 60%.

Also preferably, the ratio of the draw ratio in the machine direction $L_{MD}$ to that in the transverse direction $L_{TD}$ of the multi-layered biaxially-oriented film, $L_{MD}/L_{TD}$ is from 0.1 to 10; and the areal draw ratio thereof ($L_{MD} \times L_{TD}$) is from 9 to 80 times. Also preferably, the porosity of the film is from 0.1 to 20%.

Also preferably, the thermoplastic resin in the base layer (A) and the protective layers (B) and (C) is a polyolefin resin, more preferably a propylene based resin having a melting point of not lower than 140° C.

The invention also provides a display device that comprises the above-mentioned semitransparent reflector. Preferably, the display device of the invention has $T_P$ of from 5 to 40%, $R_P$ of from 5 to 40%, ($T_P+R_P$) of from 35 to 80%, $R_P/R$ of from 0.35 to 1, and $T_P/T$ of from 0.35 to 1, in which $T_P$ indicates the whole light transmittance (%) of the display device member of the semitransparent reflector with a polarizer bonded thereto, and $R_P$ indicates the whole light reflectance (%) of the display device member.

When installed in a display device, the semitransparent reflector of the invention ensures efficient light transmission and reflection, and attains a high transmittance and a high reflectance of the display device, therefore significantly improving the letter visibility of the device.

Figure 1:
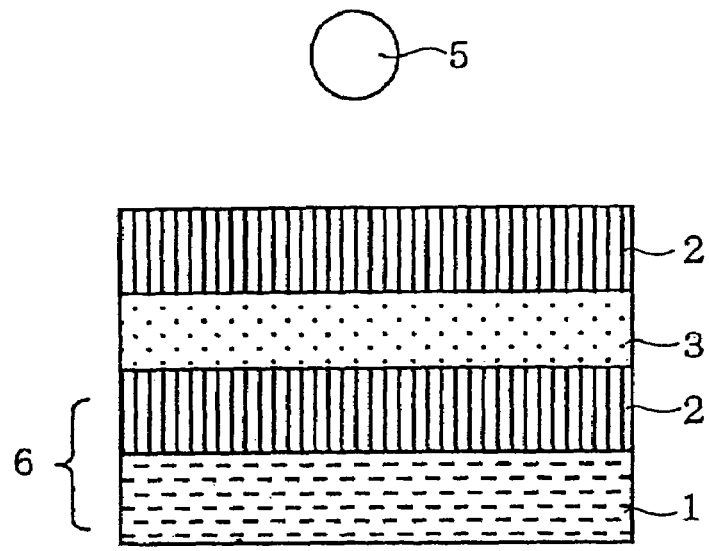
FIG. 1 is a schematic cross-sectional view of a display device.
Figure 2:
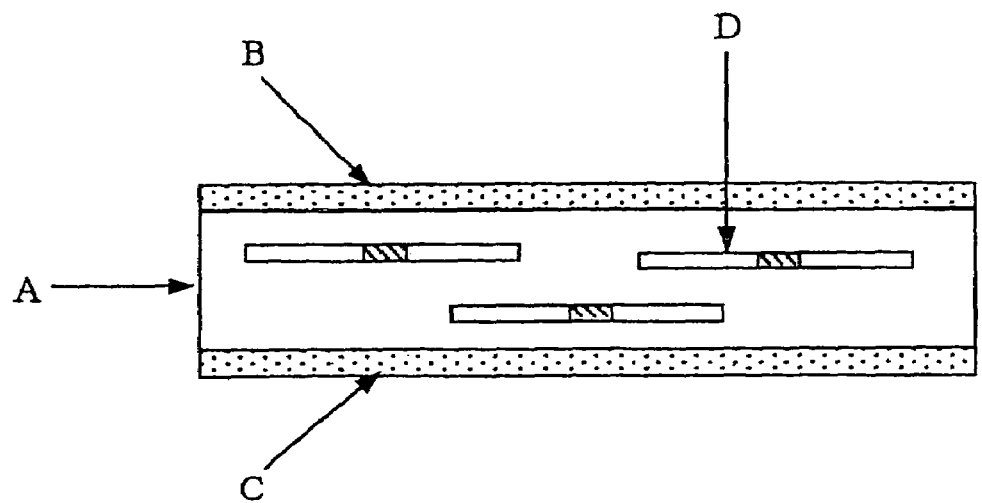
FIG. 2 is a schematic cross-sectional view of the semitransparent reflector of the invention.

In the drawings, 1 is a semitransparent reflector; 2 is a polarizer; 3 is a liquid crystal; 4 is a built-in light source; 5 is external light; 6 is a display device member; A is a base layer (A); B is a protective layer (B); C is a protective layer (C); and D is a pore (D).

BEST MODE FOR CARRYING OUT THE INVENTION

The constitution and the effect of the semitransparent reflector of the invention are described in detail hereinunder. In this description, the numerical range expressed by the wording "a number to another number" means the range that falls between the former number indicating the lowermost limit of the range and the latter number indicating the uppermost limit thereof.

Optical Properties

The semitransparent reflector of the invention is characterized in that it attains a high transmittance and a high reflectance of a display device that comprises it. As the index of attaining a high transmittance and a high reflectance of a display device, herein employed are the whole light transmittance T (%) of the semitransparent reflector, the whole light reflectance R (%) thereof, the whole light diffusion reflectance $R_d$ (%) thereof, and they are measured according to JIS-Z-8722. The semitransparent reflector of the invention has T of from 10 to 80%, preferably from 20 to 70%, more preferably from 25 to 55%. Its R is from 20 to 90%, preferably from 30 to 80%, more preferably from 40 to 70%; its (T+R) is from 80 to 100%, preferably from 90 to 100%, more preferably from 95 to 100%; and its $(R-R_d)$ is from 8 to 30%, preferably from 10 to 25%, more preferably from 10 to 20%. If T is lower than 10% and R is higher than 90%, then it is unfavorable since the visibility through the reflector while the built-in light source is on is not good. If T is higher than 80% and R is lower than 20%, then it is unfavorable since the visibility through the reflector in the light is not good. If $(R-R_d)$ is lower than 8%, then it is unfavorable since the visibility of the display member is extremely poor; and if $(R-R_d)$ is higher than 30%, then it is also unfavorable since the display member may glare.

For the index of the balance between the whole light transmittance T (%) and the whole light reflectance R (%), the absolute value of the difference between them, |(T–R)| is referred to. Preferably, the semitransparent reflector of the invention has the value of from 0 to 60%, more preferably from 0 to 50%, even more preferably from 0 to 40%. If the value |(T–R)– is more than 60%, then the balance between the whole light transmittance T and the whole light reflectance R will be poor and the potency of the semitransparent reflector may be thereby poor.

The display device member (6) that comprises the semitransparent reflector of the invention and a polarizer is taken out of the display device having the constitution of FIG. 1. Its whole light transmittance $T_P$ (%) is preferably from 5 to 40%, more preferably from 10 to 30%, even more preferably from 10 to 25%. If $T_P$ is lower than 5%, then the visibility through the member in the dark may be poor; and if $T_P$ is higher than 40%, then the visibility through it in the light may be poor. The whole light reflectance $R_P$ (%) of the member is preferably from 5 to 40%, more preferably from 10 to 35%, even more preferably from 15 to 30%. If $R_P$ is lower than 5%, then the visibility through the member in the dark may be poor; and if $R_P$ is higher than 40%, then the visibility through it in the light may be poor. $(T_P+R_P)$ is preferably from 35 to 80%, more preferably from 35 to 55%, even more preferably from 37 to 50%. If $(T_P+R_P)$ is lower than 35%, then the visibility through the member may be low both in the light and in the dark, and the potency of the display device comprising the member may be thereby poor. If $(T_P+R_P)$ is higher than 80%, then the device could no enjoy a display contrast.

$R_P/R$ and $T_P/T$ are preferably from 0.35 to 1, more preferably from 0.35 to 0.6, even more preferably from 0.35 to 0.5. If $R_P/R$ and $T_P/T$ are less than 0.35, then the visibility through the display member will be low both in the light and in the dark and the potency of the display member may be thereby poor.

Base Layer (A)

The base layer (A) to constitute the semitransparent reflector of the invention contains a thermoplastic resin, and may contain a flaky inorganic fine powder and/or an organic filler.

The thermoplastic resin usable herein includes polyolefin resins such as ethylene based resins such as linear low-density polyethylene, high-density polyethylene, medium-density polyethylene; propylene based resins; polymethyl-1-pentene; polyamide resins such as nylon-6, nylon-6,6, nylon-6,10, nylon-6,12; thermoplastic polyester resins such as polyethylene terephthalate and its copolymers, polyethylene naphthalate, aliphatic polyesters; polycarbonates, atactic polystyrene, polyphenylene sulfide. Two or more of these may be used herein as combined. Of those, preferred are polyolefin resins. Of polyolefin resins, more preferred are propylene based resins in view of their chemical resistance and cost.

For the propylene based resins, usable are propylene homopolymers, and copolymers of the essential ingredient propylene with other α-olefin such as ethylene, 1-butene, 1-hexene, 1-heptene, 4-methyl-1-pentene. The stereospecificity of the polymers is not specifically defined. The polymers may be isotactic or syndiotactic or may have any other various degree of stereospecificity. The copolymers may be binary, ternary or quaternary copolymers, and may also be random copolymers or block copolymers.

Preferably, the content of the thermoplastic resin in the layer is from 70 to 98% by weight, more preferably from 85 to 97% by weight.

The flaky inorganic fine powder that may be in the base layer (A) to constitute the semitransparent reflector of the invention is not specifically defined in point of its type, so far as it is flaky. The term "flaky" as referred to herein is meant to indicate that the mean aspect ratio of the substance is from 2 to 100. If the aspect ratio is smaller than 2 or larger than 100, then the layer could not have the intended flaky pores. Specific examples of the flaky inorganic fine powder usable in the invention are muscovite, phlogopite, talc, sericite, kaolinite, synthetic mica and titanium dioxide-coated mica.

The type of the organic filler that may be used in the base layer (A) is not also specifically defined. For example, it includes amorphous polyolefins, crosslinked (meth) acrylic-styrene copolymers, polyethylene terephthalate, polycarbonates, nylon-6, nylon-6,6, cyclic olefin homopolymers, cyclic olefin copolymers having a melting point of from 100° C. to 300° C. when they are crystalline resins, or having a glass transition temperature of from 80° C. to 140° C. when they are amorphous resins. Preferably, the organic filler that may be in the base layer (A) has a melting point (when it is a crystalline resin) or a glass transition temperature (when it is an amorphous resin) equal to or lower than the stretching temperature in film formation.

The base layer (A) may contain one or more selected from the above-mentioned flaky inorganic fine powder or organic filler, either alone or as combined. When two or more of them, as combined, are used in the layer, then a flaky inorganic fine powder and an organic filler may be combined.

The amount of the flaky inorganic fine powder and/or the organic filler that may be in the base layer (A) is preferably from 2 to 30% by weight, more preferably from 3 to 15% by weight. If the amount is smaller than 2% by weight, then satisfactory pores could not be formed in the layer and the reflector could not attain satisfactory light reflection. If the amount is larger than 30% by weight, then the reflector could not attain satisfactory light transmission.

The thickness of the base layer (A) is preferably from 10 to 200 μm, more preferably from 20 to 100 μm, even more preferably from 20 to 60 μm.

Protective Layers (B), (C)

The semitransparent reflector of the invention preferably has a multi-layered structure with protective layers (B) and (C) formed therein. However, it may be a single-layered structure of the base layer (A) alone. The protective layers (B) and (c) contain a thermoplastic resin, and may further contain a flaky inorganic fine powder and/or an organic filler.

The thermoplastic resin, the flaky inorganic fine powder and the organic filler for the protective layers (B) and (C) may be the same as those for the base layer (A). Preferably, the amount of the thermoplastic resin in the layers is from 70 to 100% by weight, more preferably from 85 to 100% by weight. For the thermoplastic resin, preferred are propylene based resins; and more preferred are propylene homopolymers, and propylene copolymers having a melting point of not lower than 140° C. (melting peak temperature in DSC measurement at a heating rate of 10° C./min). If a resin having a melting point of lower than 140° C. is in the protective layers (B) and (C), then the sheet melt having been extruded out to be the multi-layered biaxially-oriented film for the reflector of the invention would stick to chill rolls when it is cooled thereon and the film surface may be thereby scratched or unevenly whitened, and, as a result, films having a high transmittance and a high reflectance could not be obtained.

The amount of the flaky inorganic fine powder and/or organic filler that may be in the protective layers (B) and (C) is preferably from 0 to 30% by weight, more preferably from 0 to 15% by weight.

The thickness of the protective layers (B) and (C) is preferably at least 0.1 μm, more preferably from 0.2 to 20 μm, even more preferably from 0.3 to 8 μm.

It is desirable that the base layer (A) and the protective layers (B) and (C) are laminated and then biaxially stretched to produce the semitransparent reflector of the invention.

Additives

If desired, the semitransparent reflector of the invention may contain heat stabilizer, light stabilizer, dispersant and lubricant. The heat stabilizer includes steric-hindered phenols, and phosphorus-containing or amine-type stabilizers, and its amount may be from 0.001 to 1% by weight. The light stabilizer includes steric-hindered amines and benzotriazole-type or benzophenone-type light stabilizers, and its amount may be from 0.001 to 1% by weight. The dispersant for inorganic fine powder includes silane coupling agents, higher fatty acids such as oleic acid and stearic acid, metal soap, polyacrylic acid, polymethacrylic acid and their salts, and its amount may be from 0.01 to 4% by weight.

Forming

For forming a composition that contains a thermoplastic resin, a flaky inorganic fine powder and/or an organic filler, employable is an ordinary biaxially-stretching method.

One concrete example of the method comprises melting and kneading a composition that contains a thermoplastic resin, a flaky inorganic fine powder and/or an organic filler, in an extruder, then extruding the resulting resin melt through a single-layered or multi-layered T-die or I-die connected to the extruder, to give a sheet, and then biaxially stretching the resulting sheet according to a combination of MD stretching based on the peripheral speed difference between rolls and TD stretching by the use of a tenter oven, or simultaneously biaxially stretching it by a combination of a tenter oven and a linear motor.

The stretching temperature may be lower by from 2 to 60° C. than the melting point of the thermoplastic resin used. When the resin is a propylene homopolymer (m.p.; 155-167° C.), the temperature is preferably from 120 to 164° C.; and when the resin is a high-density polyethylene (m.p.; 121-134° C.), the temperature is preferably from 110 to 120° C. Preferably, the stretching rate is from 20 to 350 m/min.

Preferably, the flaky pores to be in the multi-layered biaxially-oriented film are such that the ratio of the pore size X (μm) in the machine direction to the pore size Y (μm) in the transverse direction, X/Y is from 0.1 to 10, more preferably from 0.4 to 1.5. Also preferably, the mean aspect ratio of the pores, Y/H is from 20 to 1000, more preferably from 40 to 500, in which H indicates the pore height (μm).

For controlling the size of the flaky pores to be in the multi-layered biaxially-oriented film, the areal draw ratio=(machine-direction draw ratio $L_{MD}$)×(transverse-direction draw ratio $L_{TD}$) is preferably from 9 to 80 times, more preferably from 20 to 70 times, even more preferably from 30 to 60 times.

For controlling the ratio X/Y of the flaky pores to be in the multi-layered biaxially-oriented film, the ratio of machine-direction draw ratio $L_{MD}$ to transverse-direction draw ratio $L_{TD}$, $L_{MD}/L_{TD}$ is preferably from 0.1 to 10, more preferably from 0.4 to 1.5.

If $L_{MD} \times L_{TD}$ and $L_{MD}/L_{TD}$ overstep the ranges, then flaky pores similar to a true circle (X/Y≈1) and oriented in parallel to the surface of the semitransparent reflector will be difficult to form.

For controlling the pore size, the flaky inorganic fine powder to be used preferably has a mean particle size of from 3 to 30 μm and a mean aspect ratio of from 2 to 100, more preferably from 2 to 30. The mean dispersion particle size of the organic filler is preferably from 10 to 50 μm, more preferably from 15 to 40 μm; the mean aspect ratio thereof after biaxially stretched thereof is preferably from 10 to 1000, more preferably from 20 to 500, even more preferably from 30 to 300. If the mean particle size of the flaky inorganic fine powder is smaller than 3 μm or if the mean dispersion particle size of the organic filler is smaller than 10 μm, then the intended porosity could not be attained. If the mean aspect ratio of the flaky inorganic fine powder is smaller than 2 or larger than 100 or if the mean aspect ratio of the organic filler after biaxially stretched is smaller than 10 or larger than 1000, then the flaky pores will be difficult to form.

The mean particle size of the flaky inorganic fine powder as referred to herein is measured with a laser diffractometric particle sizer, "Microtrack"; and the mean aspect ratio thereof is an average of the data of the aspect ratio (major diameter of flaky particle/thickness of flaky particle) of 100 particles of the flaky inorganic fine powder. The mean dispersion particle size of the organic filler as referred to herein is obtained through electromicroscopic observation of the cross section of sheet. Concretely, an extruded and non-stretched sheet is embedded and fixed in an epoxy resin, and cut with a microtome in a direction parallel to the thickness of the sheet and vertical to the surface thereof, and the cross section of the sample is metallized and then observed with a scanning electronic microscope at any desired magnification, for example, at 500 to 2000-time magnification. The mean aspect ratio of the organic filler after biaxially stretched is an average of the data of the aspect ratio (filler diameter in transverse direction/filler diameter in the thickness direction of the base layer (A)) of 100 particles of the organic filler.

For effectively forming the desired pores, for example, the flaky inorganic fine powder to be used in the base layer (A) and in the protective layers (B) and (C) may be so controlled that its relative surface area at least 13000 cm$^2$/g and it does not contain particles having a particle size of 50 μm or more. In particular, it is desirable to use talc, muscovite and synthetic mica not containing particles of 50 μm or more in size and having a sharp particle size distribution.

If the pore size is not uniform, then the film may be unevenly whitened and the appearance and the optical properties of the product will be thereby worsened.

For controlling the number of the pores to be formed, per the unit volume thereof, in the base layer (A) and the protective layers (B) and (C) of the semitransparent reflector of the invention, the porosity of the base layer (A) is preferably from 0.1 to 20%, more preferably from 0.1 to 15%, and the porosity of the protective layers (B) and (C) is preferably from 0 to 20%, more preferably from 0 to 10%.

The "porosity" as referred to herein is meant to indicate a value to be calculated according to the following formula (1):

$$\text{Porosity}(\%) = (\rho_0 - \rho)/\rho_0 \times 100 \tag{1}$$

wherein $\rho_0$ indicates the true density of the film, and $\rho$ indicates the density (JIS-P-8118) of the film after stretched.

So far as the material before stretched does not contain a large amount of air, the true density of the film is almost equal to the density thereof before stretched.

Concretely, the produced, multi-layered biaxially-oriented film is weighed to obtain its basis weight (g/m$^2$). The thickness (μm) of the multi-layered biaxially-oriented film is measured (with a micrometer or through electromicroscopic observation), and the ratio of basis weight/thickness is calculated. From this, the density of the multi-layered biaxially-oriented film (after stretched) is obtained. When the film is coated with porous protective layers (B) and (C) and when the porosity of each layer of the film is determined, the cross section of the film is observed with a scanning electronic microscope at an enlargement magnification of from 500 to 2000 times. In one example, a photographic picture of the observed region of a film sample is taken, then the pores are traced onto a tracing film and painted out, the resulting drawing is analyzed with an image processor (Nireco's Model Luzex IID), and the areal ratio of the pores is obtained to be the porosity.

The density of the multi-layered biaxially-oriented film for use in the invention generally falls within a range of from 0.8 to 0.94 g/cm$^3$, and the film having larger pores may enjoy more improved reflection characteristics. From these, the suitable range of the porosity of the base layer (A) and the protective layers (B) and (C) is determined to the effect mentioned hereinabove.

Not specifically defined, the shape of the semitransparent reflector of the invention may be suitably determined in accordance with the object and the embodiment of using it. In general, the reflector is used in the form of plates or films, but may be used in any other form. So far as it is used as a light reflector, any and every form thereof shall be within the scope of the invention.

The invention is described more concretely with reference to the following Examples, Comparative Examples and Test Examples. The material, the amount for use, the ratio, the treatment and the treatment order mentioned below may be changed in any desired manner, not overstepping the spirit of the invention. Accordingly, the scope of the invention should not be limitatively interpreted by the concrete examples mentioned below.

EXAMPLES 1 TO 6

Propylene homopolymer, high-density polyethylene, flaky inorganic fine powder or organic filler shown in Table 1 was formulated in the ratio as in Table 2 to give compositions (A), (B) and (C). These were separately melted and kneaded in three different extruders at 250° C. Next, these were fed into one co-extruding die, and formed into a laminate of base layer (A) and protective layers (B) and (C) in the die, then extruded out as a sheet, and cooled with a chill roll to about 60° C. to give a laminate film (B/A/C).

The base layer (A) and the protective layers (B) and (C) contained 0.05 parts by weight of an antioxidant, phenolic stabilizer (Ciba-Geigy's Irganox 1010), and 0.05 parts by weight of a radical scavenger, hindered amine-type stabilizer (Sankyo's HA-70), relative to 100 parts by weight of the thermoplastic resin therein.

The laminate was re-heated up to 135° C., and stretched in machine direction to a draw ratio as indicated in Table 2, by the use of the peripheral speed difference between several rolls, then again re-heated up to 150° C., and stretched in transverse direction to a draw ratio as indicated in Table 2, by the use of a tenter. Next, this was annealed at 160° C., and then cooled to 60° C., and its edges were trimmed off to give a multi-layered biaxially-oriented film for a semitransparent reflector.

COMPARATIVE EXAMPLE 1

Using a composition prepared by mixing the materials of Table 1 in a ratio as in Table 2, a three-layered biaxially-oriented film of synthetic paper was produced according to the method of Example 1 in JP-A 59-204825.

Evaluation

The whole light transmittance R (%), the whole light reflectance T (%), the whole light diffusion reflectance $R_d$ (%) and the porosity of the semitransparent reflectors of Examples 1 to 6 and the synthetic paper of Comparative Example 1 produced herein were determined.

For measuring the whole light reflectance R (%), the whole light transmittance T (%) and the whole light diffusion reflectance $R_d$ (%) thereof, the samples were tested according to JIS-Z-8722 by the use of a device (Hitachi's U-3310). The reflectance (%), the transmittance (%) and the diffusion reflectance (%) of each sample were measured at different wavelengths of from 400 to 700 nm, and the data were averaged.

The porosity was determined according to the above-mentioned formula (I) as a value of the entire film, for which the density of the film after stretched and the true density of the film were measured according to JIS-P-8118.

Regarding the pore ratio (X/Y) in machine direction to transverse direction, each sample was analyzed by the use of a microscope (Nikon's OPTIPHOT) at a magnification of from 100 to 400 times to observe the pores seen therein, and X/Y was calculated from the observed data.

Regarding the pore ratio (Y/H) in transverse direction to height direction, each sample was analyzed by the use of a scanning electronic microscope (Hitachi's S-2400) at a magnification of from 500 to 5000 times to observe the cross section thereof, and Y/H was calculated from the observed data.

From the display device of FIG. 1 with a polarizer (Sanritz's LL-82-12S) therein, the display device member (6) comprising the semitransparent reflector and the polarizer was taken out. The semitransparent reflector of the member (6) was replaced by the semitransparent reflectors prepared in Examples 1 to 6 or the synthetic paper of Comparative Example 1 to obtain samples. The whole light transmittance $T_P$ (%) and the whole light reflectance $R_P$ (%) of the samples were measured in the same manner as above.

A display device of FIG. 1 having each sample as a display device member (6) was prepared. The built-in light source (4) was turned on in the dark and the light was transmitted. Letter visibility in display mode of the liquid crystal (3) was evaluated. Next, external light was reflected in the light and letter visibility in display mode of the liquid crystal (3) was evaluated. Evaluation standard is as follows:

E (Excellent): letters are clearly displayed and can be read easily.

G (Good): practical, letters are readable

P (Poor): letters are unclear and hardly readable.

F (Failed): No letters are readable.

The data are all shown in Tables 2 to 4.

TABLE 1

| Name of Material | Details |
|---|---|
| Propylene Homopolymer (PP1) | Propylene Homopolymer [Nippon Polychem's Novatec PP:MA4] (MFR (230° C., 2.16 kg load) = 5 g/10 min) |
| Propylene Homopolymer (PP2) | Propylene Homopolymer [Nippon Polychem's Novatec PP:MA3] (MFR (230° C., 2.16 kg load) = 11 g/10 min) |
| High-Density Polyethylene (HDPE) | High-Density Polyethylene [Nippon Polychem's Novatec HD:HJ360] (MFR (190° C., 2.16 kg load) = 5.5 g/10 min) |
| Muscovite (a) | Muscovite having a mean particle size of 4.5 μm and a mean aspect ratio of 15 [Repco's M-XF] |
| Muscovite (b) | Muscovite having a mean particle size of 24 μm and a mean aspect ratio of 28 [Repco's M-400] |
| Talc (c) | Talc having a mean particle size of 11 μm and a mean aspect ratio of 4 [Fuji Talc's LMP-100] |
| Synthetic Mica (d) | Synthetic mica having a mean particle size of 6 μm and a mean aspect ratio of 25 [Coop Chemical's MK-100] |
| $CaCO_3$ (e) | Heavy calcium carbonate having a mean particle size of 1.5 μm [Shiraishi Calcium's Softon 1800] |
| Cyclic Olefin Copolymer (f) | Cyclic olefin copolymer having a mean dispersion particle size of 30 μm and a mean aspect ratio, after biaxially stretched, of 190 [Mitsui Chemical's APL5014DP] |

TABLE 2

| | Composition of Base Layer (A) (wt. %) | | | Composition of Protective Layer (B) (wt. %) | | | Composition of Protective Layer (C) (wt. %) | | |
|---|---|---|---|---|---|---|---|---|---|
| | PP1 | HDPE | Z | PP2 | HDPE | Z | PP2 | HDPE | Z |
| Example 1 | 92.5 | 4 | (a) 3.5 | 100 | — | — | 100 | — | — |
| Example 2 | 91 | 4 | (a) 5 | 100 | — | — | 100 | — | — |
| Example 3 | 91 | 4 | (b) 5 | 100 | — | — | 100 | — | — |
| Example 4 | 91 | 4 | (c) 5 | 100 | — | — | 100 | — | — |
| Example 5 | 86 | 4 | (d) 10 | 100 | — | — | 100 | — | — |
| Example 6 | 92 | 4 | (f) 4 | 100 | — | — | 100 | — | — |
| Comparative Example 1 | 84 | 16 | — | 81 | 3 | (e) 16 | 81 | 3 | (e) 16 |

| | Thickness (μm) B/A/C | Draw Ratio MD | Draw Ratio TD | Draft Ratio MD/TD | Areal Ratio MD × TD | Porosity (%) | X/Y | Y/H |
|---|---|---|---|---|---|---|---|---|
| Example 1 | 1/42/1 | 4.5 | 9.8 | 0.46 | 44.1 | 2.2 | 0.46 | 120 |
| Example 2 | 1/48/1 | 4.5 | 10.4 | 0.43 | 46.8 | 2.1 | 0.43 | 125 |
| Example 3 | 1/51/1 | 4.5 | 10 | 0.45 | 45.0 | 10.6 | 0.45 | 260 |
| Example 4 | 1/40/1 | 4.5 | 12 | 0.38 | 54.0 | 5.3 | 0.38 | 48 |
| Example 5 | 1/51/1 | 4.5 | 9.1 | 0.49 | 41.0 | 5.3 | 0.49 | 225 |
| Example 6 | 2/47/2 | 4.0 | 7.0 | 0.57 | 28.0 | 1.8 | 0.57 | 210 |
| Comparative Example 1 | 10/20/10 | 5.0 | 5.05 | 0.99 | 25.3 | 25.0 | 0.99 | 8 |

Note: Z is flaky inorganic fine powder, organic filler, inorganic fine powder.

TABLE 3

Optical Characteristics of Semitransparent Reflector (%)

| | T | R | $R_d$ | T + R | |T − R| | R − $R_d$ |
|---|---|---|---|---|---|---|
| Example 1 | 43.7 | 51.9 | 38.5 | 95.6 | 8.2 | 13.4 |
| Example 2 | 35.9 | 60.7 | 48.4 | 96.6 | 24.8 | 12.3 |
| Example 3 | 40.3 | 57.1 | 43.2 | 97.4 | 16.9 | 14.0 |
| Example 4 | 41.9 | 52.8 | 37.6 | 94.7 | 10.8 | 15.1 |
| Example 5 | 30.9 | 65.8 | 52.2 | 96.7 | 35.0 | 13.6 |
| Example 6 | 46.4 | 48.8 | 34.2 | 95.2 | 2.4 | 14.6 |
| Comparative Example 1 | 37.0 | 63.0 | 59.9 | 100.0 | 26.0 | 3.1 |

TABLE 4

Optical Characteristics of Display Device

| | $T_p$ (%) | $R_p$ (%) | $T_p + R_p$ (%) | $T_p/T$ | $R_p/R$ |
|---|---|---|---|---|---|
| Example 1 | 20.6 | 22.6 | 43.1 | 0.47 | 0.44 |
| Example 2 | 14.3 | 25.1 | 39.4 | 0.40 | 0.41 |
| Example 3 | 17.9 | 24.9 | 42.8 | 0.45 | 0.44 |
| Example 4 | 19.4 | 23.0 | 42.4 | 0.46 | 0.44 |
| Example 5 | 12.3 | 27.4 | 39.7 | 0.40 | 0.42 |
| Example 6 | 19.8 | 21.6 | 41.4 | 0.43 | 0.44 |
| Comparative Example 1 | 15.5 | 18.4 | 33.9 | 0.42 | 0.29 |

The present disclosure relates to the subject matter contained in PCT/JP02/10032 filed Sep. 27, 2002, and Japanese Patent Application No. 299547/2001 filed Sep. 28, 2001, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A semitransparent reflector comprising:
a multi-layered, biaxially-oriented film comprising a base layer (A) and protective layers (B) and (C) provided on the base layer (A),
wherein the base layer (A) has flaky pores (D) and comprises a thermoplastic resin, a flaky inorganic fine powder and/or an organic filler, and the multi-layered, biaxially-oriented film satisfies the following optical characteristics (1) and (2):

$10\% \leq T \leq 80\%$, (1)

$20\% \leq R \leq 90\%$, $80\% \leq (T+R) \leq 100\%$ $8\% \leq (R-R_d) \leq 30\%$, (2)

where T indicates the whole light transmittance (%) of the reflector, R indicates the whole light reflectance (%) thereof, $R_d$ indicates the whole light diffusion reflectance (%) thereof.

2. A semitransparent reflector comprising:
a multi-layered, biaxially-oriented film comprising a base layer (A) and protective layers (B) and (C) provided on the base layer (A),
wherein the base layer (A) has flaky pores (D) and comprises a thermoplastic resin, a flaky inorganic fine powder and/or an organic filler, and the multi-layered, biaxially-oriented film satisfies the following optical characteristics (1) and (2):

$20\% \leq T \leq 70\%$, (1)

$30\% \leq R \leq 80\%$, $90\% \leq (T+R) \leq 100\%$, $10\% \leq (R-R_d) \leq 25\%$, (2)

where T indicates the whole light transmittance (%) of the reflector, R indicates the whole light reflectance (%) thereof, $R_d$ indicates the whole light diffusion reflectance (%) thereof.

3. A semitransparent reflector comprising:
a multi-layered, biaxially-oriented film comprising a base layer (A) and protective layers (B) and (C) provided on the base layer (A),
wherein the base layer (A) has flaky pores (D) and comprises a thermoplastic resin, a flaky inorganic fine powder and/or an organic filler, and the multi-layered, biaxially-oriented film satisfies the following optical characteristics (1) and (2):

$25\% \leq T \leq 55\%$, (1)

$40\% \leq R \leq 70\%$, $95\% \leq (T+R) \leq 100\%$, $10\% \leq (R-R_d) \leq 20\%$, (2)

where T indicates the whole light transmittance (%) of the reflector, R indicates the whole light reflectance (%) thereof, $R_d$ indicates the whole light diffusion reflectance (%) thereof.

4. The semitransparent reflector as claimed in claim 1, wherein the protective layers (B) and (C) contain a thermoplastic resin, a flaky inorganic fine powder and/or an organic filler.

5. The semitransparent reflector as claimed in claim 4, wherein the flaky pores (D) satisfy the following (1) to (3):

$0.1 \leq X/Y \leq 10$, (1)

$20 \leq Y/H \leq 1000$, (2)

$0.1\% \leq \text{porosity} \leq 20\%$, (3)

wherein X indicates the pore diameter (μm) in the machine direction, Y indicates the pore diameter (μm) in the transverse direction, and H indicates the pore height (μm).

6. The semitransparent reflector as claimed in claim 4, wherein the flaky pores (D) satisfy the following (1) to (3):

$0.4 \leq X/Y \leq 1.5$, (1)

$40 \leq Y/H \leq 500$, (2)

$0.1\% \leq \text{porosity} \leq 15\%$, (3)

wherein X indicates the pore diameter (μm) in the machine direction, Y indicates the pore diameter (μm) in the transverse direction, and H indicates the pore height (μm).

7. The semitransparent reflector as claimed in claim 4, wherein the mean particle size of the flaky inorganic fine powder is from 3 to 30 μm, the mean aspect ratio thereof is from 2 to 100, the amount of the flaky inorganic fine powder in the base layer (A) is from 2 to 30% by weight, and the amount of the flaky inorganic fine powder in the protective layers (B) and (C) is from 0 to 30% by weight.

8. The semitransparent reflector as claimed in claim 4, wherein the mean dispersion particle size of the organic filler is from 10 to 50 μm, the mean aspect ratio thereof after biaxially stretched is from 10 to 1000, the amount of the organic filler in the base layer (A) is from 2 to 30% by weight, and the amount of the organic filler in the protective layers (B) and (C) is from 0 to 30% by weight.

9. The semitransparent reflector as claimed in claim 4, wherein the multi-layered biaxially-oriented film satisfies an optical characteristic of $0\% \leq |(T-R)| \leq 60\%$.

10. The semitransparent reflector as claimed in claim 4, wherein the multi-layered biaxially-oriented film satisfies an optical characteristic of $0\% \leq |(T-R)| \leq 40\%$.

11. The semitransparent reflector as claimed in claim 4, wherein the ratio of the draw ratio in the machine direction $L_{MD}$ to that in the transverse direction $L_{TD}$ of the multi-layered biaxially-oriented film, $L_{MD}/L_{TD}$ is from 0.1 to 10.

12. The semitransparent reflector as claimed in claim 4, wherein the ratio of the draw ratio in the machine direction $L_{MD}$ to that in the transverse direction $L_{TD}$ of the multi-layered biaxially-oriented film, $L_{MD}/L_{TD}$ is from 0.4 to 1.5.

13. The semitransparent reflector as claimed in claim 4, wherein the areal draw ratio ($L_{MD} \times L_{TD}$) of the multi-layered biaxially-oriented film is from 9 to 80 times.

14. The semitransparent reflector as claimed in claim 4, wherein the areal draw ratio ($L_{MD} \times L_{TD}$) of the multi-layered biaxially-oriented film is from 30 to 60 times.

15. The semitransparent reflector as claimed in claim 4, wherein the thermoplastic resin includes a polyolefin resin.

16. The semitransparent reflector as claimed in claim 15, wherein the polyolefin resin is a propylene based resin having a melting point of not lower than 140° C.

17. A display device comprising the semitransparent reflector of claim 1.

18. A display device with a member comprising the semitransparent reflector of claim 1 and a polarizer bonded thereto, in which the member satisfies the following optical characteristics (1) and (2):

$$5\% \leq T_P \leq 40\%, \quad (1)$$

$$5\% \leq R_P \leq 40\%,$$

$$35\% \leq (T_P + R_P) \leq 80\%,$$

$$0.35 \leq R_P/R \leq 1, \quad (2)$$

$$0.35 \leq T_P/T \leq 1,$$

wherein $T_p$ indicates the whole light transmittance (%) of the display device member, and $R_P$ indicates the whole light reflectance (%) of the display device member.

19. A display device with a member comprising the semitransparent reflector of claim 1 and a polarizer bonded thereto, in which the member satisfies the following optical characteristics (1) and (2):

$$10\% \leq T_P \leq 30\%, \quad (1)$$

$$10\% \leq R_P \leq 35\%,$$

$$35\% \leq (T_P + R_P) \leq 55\%,$$

$$0.35 \leq R_P/R \leq 0.6, \quad (2)$$

$$0.35 \leq T_P/T \leq 0.6,$$

wherein $T_P$ indicates the whole light transmittance (%) of the display device member, and $R_P$ indicates the whole light reflectance (%) of the display device member.

20. A display device with a member comprising the semitransparent reflector of claim 1 and a polarizer bonded thereto, in which the member satisfies the following optical characteristics (1) and (2):

$$10\% \leq T_P \leq 25\%, \quad (1)$$

$$15\% \leq R_P \leq 30\%,$$

$$37\% \leq (T_P + R_P) \leq 50\%,$$

$$0.35 \leq R_P/R \leq 0.5, \quad (2)$$

$$0.35 \leq T_P/T \leq 0.5,$$

wherein $T_P$ indicates the whole light transmittance (%) of the display device member, and $R_P$ indicates the whole light reflectance (%) of the display device member.

* * * * *